United States Patent
Cuevas et al.

(10) Patent No.: US 6,168,194 B1
(45) Date of Patent: Jan. 2, 2001

(54) INFLATABLE CURTAIN WITH TENSIONING DEVICE

(75) Inventors: Jess A. Cuevas, Scottsdale; Ahmad K. Al-Amin, Higley; Bryan W. Shirk, Mesa; Timothy A. Swann, Mesa; Roy D. Van Wynsberghe, Mesa, all of AZ (US)

(73) Assignee: TRW Inc., Lyndhurst, OH (US)

( * ) Notice: Under 35 U.S.C. 154(b), the term of this patent shall be extended for 0 days.

(21) Appl. No.: 09/368,712

(22) Filed: Aug. 5, 1999

(51) Int. Cl.[7] .................................................. B60R 21/22
(52) U.S. Cl. ........................ 280/730.2; 280/736; 280/749
(58) Field of Search ............................... 280/730.2, 749, 280/753, 736, 740

(56) References Cited

U.S. PATENT DOCUMENTS

| 3,687,485 | 8/1972 | Campbell . |
| 5,265,903 | 11/1993 | Kuretake et al. . |
| 5,333,898 | 8/1994 | Stutz . |
| 5,462,308 | 10/1995 | Seki et al. . |
| 5,588,672 | 12/1996 | Karlow et al. . |
| 5,660,414 | 8/1997 | Karlow et al. . |
| 5,707,075 | 1/1998 | Kraft et al. . |
| 5,752,713 | * 5/1998 | Matsuura et al. .................. 280/730.2 |
| 5,788,270 | 8/1998 | Haland et al. . |
| 5,865,462 | 2/1999 | Robins et al. . |
| 5,924,722 | * 7/1999 | Koide et al. ....................... 280/730.2 |

* cited by examiner

Primary Examiner—Peter C. English
(74) Attorney, Agent, or Firm—Tarolli, Sundheim, Covell, Tummino & Szabo L.L.P.

(57) ABSTRACT

An apparatus (10) for helping to protect an occupant of a vehicle (12) which has a side structure (16) and a roof (28) comprises a vehicle occupant protection device (14). The vehicle occupant protection device (14) is inflatable away from the vehicle roof (28) into a position along the vehicle side structure (16) between the side structure and a vehicle occupant. An inflator (24) provides inflation fluid for inflating the vehicle occupant protection device (14). A flexible elongated member (54) resists movement of the vehicle occupant protection device (14) away from the vehicle side structure (16) when the vehicle occupant protection device is inflated. A tensioning member (52) is movable a given distance upon inflation of the vehicle occupant protection device (14). The tensioning member (52) retracts a length of the flexible elongated member (54) equal to at least approximately twice the given distance when the tensioning member (52) moves the given distance.

8 Claims, 2 Drawing Sheets

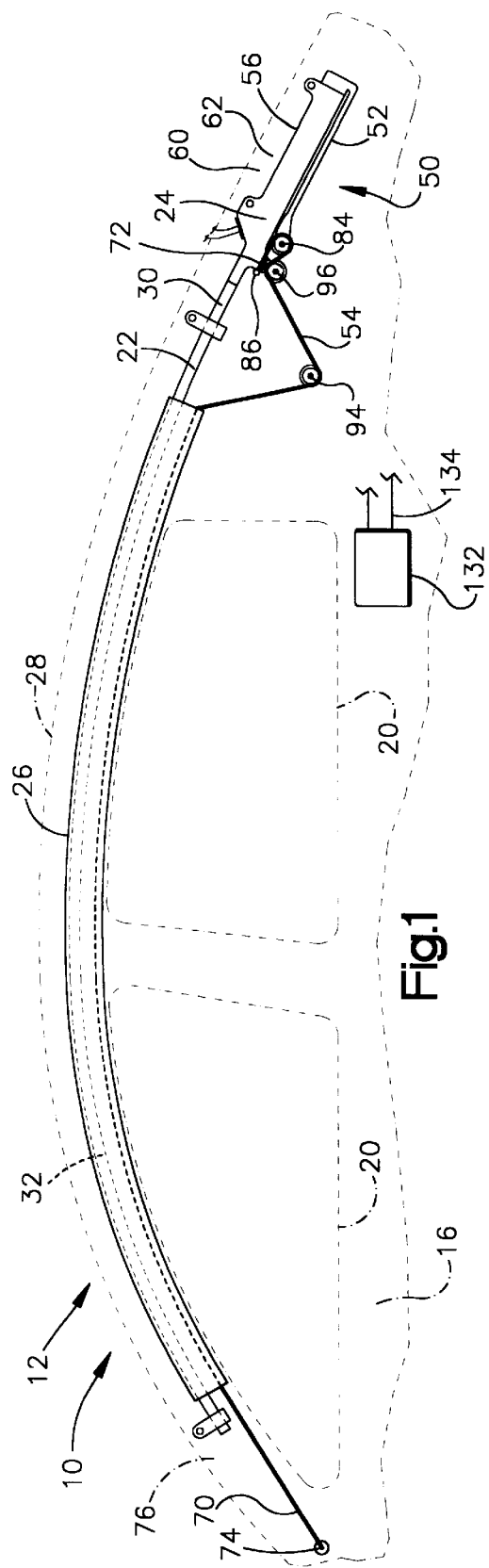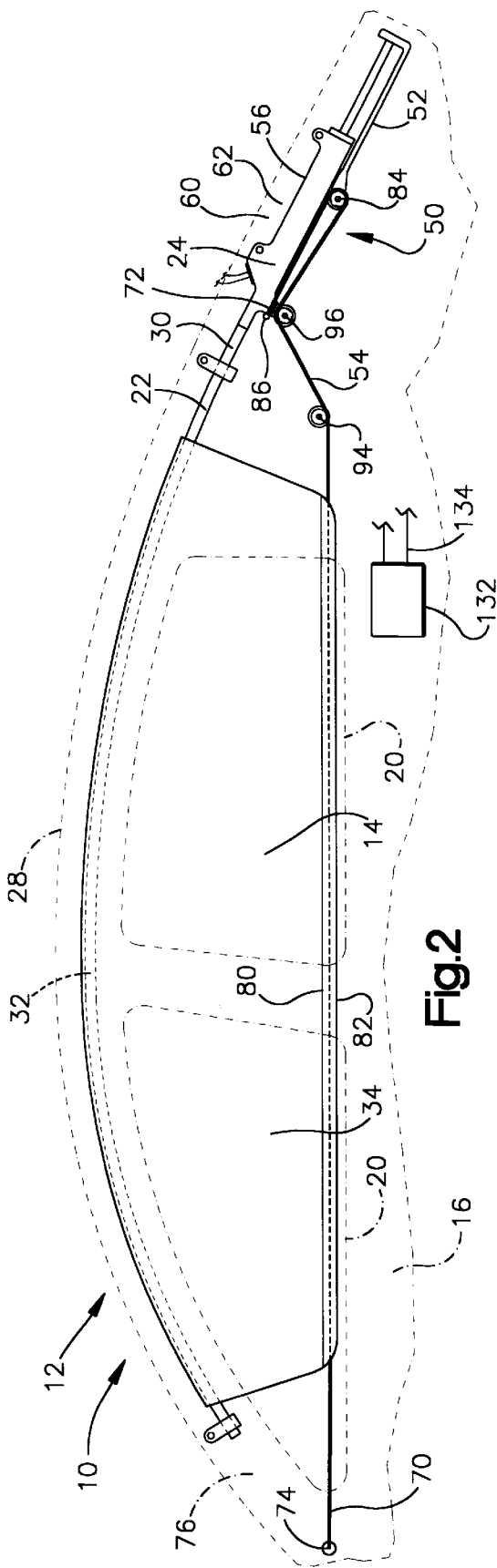

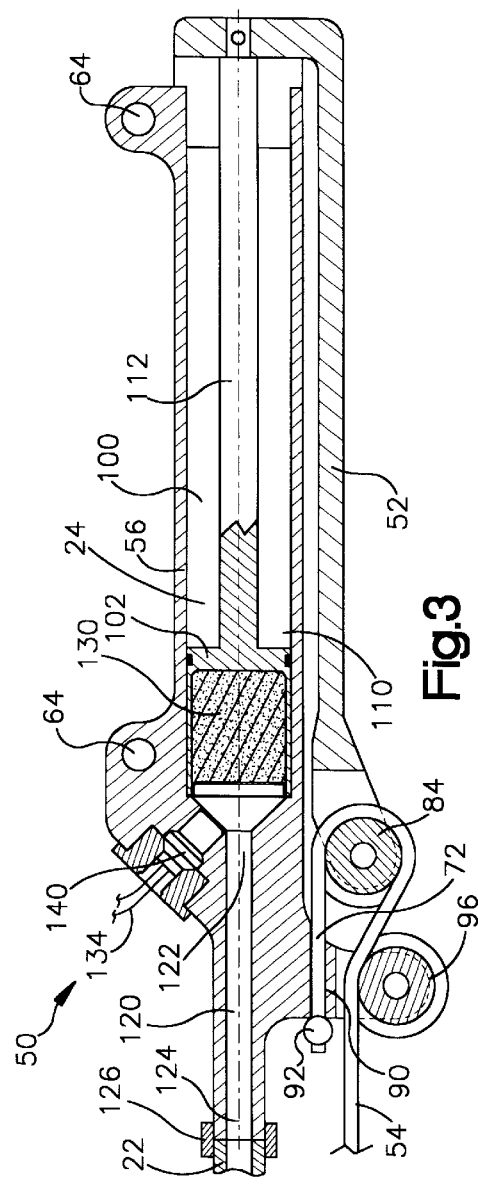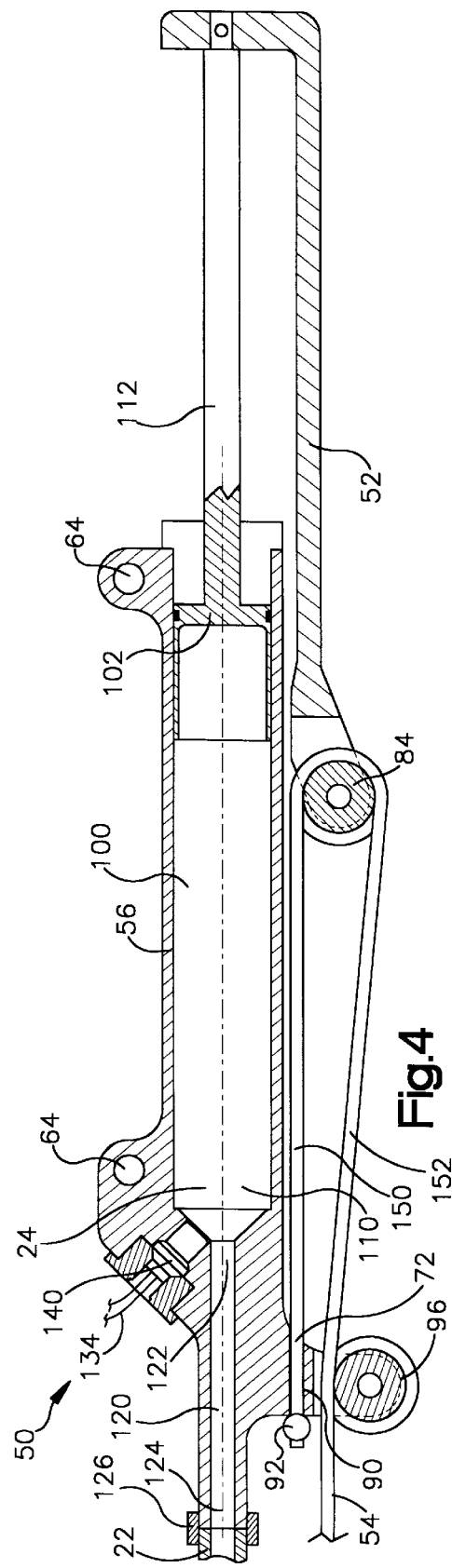

INFLATABLE CURTAIN WITH TENSIONING DEVICE

FIELD OF THE INVENTION

The present invention relates to an inflatable vehicle occupant protection device for helping to protect a vehicle occupant in the event of a side impact to a vehicle and/or a vehicle rollover.

BACKGROUND OF THE INVENTION

It is known to inflate a vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of the vehicle in the event of a side impact or rollover. Such an inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle that has a side structure. The apparatus includes a vehicle occupant protection device that is inflatable away from the roof into a position along the vehicle side structure between the side structure and a vehicle occupant. An inflator provides inflation fluid for inflating the vehicle occupant protection device.

A flexible elongated member resists movement of the vehicle occupant protection device away from the vehicle side structure when the vehicle occupant protection device is inflated. A tensioning member is movable a given distance upon inflation of the vehicle occupant protection device. The tensioning member retracts a length of the flexible elongated member equal to at least approximately twice the given distance when the tensioning member moves the given distance.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic view of an inflatable vehicle safety apparatus embodying the present invention in a deflated condition;

FIG. 2 is a schematic view of the vehicle safety apparatus of FIG. 1 in an inflated condition;

FIG. 3 is an enlarged schematic view, partially in section, of a portion of the vehicle safety apparatus of FIG. 1; and FIG. 4 is an enlarged schematic view, partially in section, of a portion of the vehicle safety apparatus of FIG. 2.

DESCRIPTION OF PREFERRED EMBODIMENTS

As representative of the present invention, an apparatus 10 for helping to protect an occupant of a vehicle 12 includes a vehicle occupant protection device. As shown in FIGS. 1 and 2, a particular type of vehicle occupant protection device comprises an inflatable curtain 14 mounted adjacent to the side structure 16 of the vehicle 12. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24. The fill tube 22 has a second end portion 32 which is disposed in a main chamber 34 (FIG. 2) of the inflatable curtain 14, The second end portion 32 of the fill tube 22 has a plurality of openings (not shown) that provide fluid communication between the fill tube 22 and the main chamber 34 of the inflatable curtain 14.

The apparatus 10 includes a housing 26 (FIG. 1) that stores the inflatable curtain 14 in a deflated condition. The fill tube 22, the deflated inflatable curtain 14, and housing 26 have an elongated configuration and extend along the vehicle roof 28 and along the side structure 16 of the vehicle 12 above the side windows 20.

As illustrated in FIGS. 1 and 2, the apparatus 10 includes a tensioning device 50. The tensioning device 50 includes a tensioning member 52, flexible elongated member 54, and a housing 56. The tensioning device 50 is fixed to the side structure 16 of the vehicle 12 at a location designated 60 near or on a C pillar 62 of the vehicle 12. As best viewed in FIGS. 3 and 4, the housing 56 includes fastener apertures 64 through which fasteners (not shown) may be inserted in order to fasten the tensioning device 50 to the side structure 16 of the vehicle 12.

The flexible elongated member 54 (FIGS. 1 and 2) comprises a cable, or the like, and has a first end 70 and an opposite second end 72. The first end 70 of the flexible elongated member 54 is fixedly connected to the side structure 16 of the vehicle 12 at a first location 74 near or on an A pillar 76 of the vehicle 12. The flexible elongated member 54 extends from the first location 74 through a sleeve 80 (FIG. 2) formed along a bottom edge 82 of the inflatable curtain 14. The flexible elongated member 54 extends from the sleeve 80 and around a sheave 84 which is fixed to the tensioning member 52. The second end 72 of the flexible elongated member 54 is secured to the housing 56 of the tensioning device 50 at a location 86.

As illustrated in FIGS. 3 and 4, the second end 72 of the flexible elongated member 54 is inserted through an anchoring passage 90 in the housing 56. A stop piece 92 is secured to the second end 72 of the flexible elongated member 54 in order to prevent the flexible elongated member 54 from being pulled out of the passage 90. In the deflated condition of the inflatable curtain 14 shown in FIG. 1, the flexible elongated member 54 is stored in the housing 26 and extends along the vehicle roof 28 and side structure 16 of the vehicle 12 above the side windows 20.

In the illustrated embodiment, the flexible elongated member 54 is guided from the sleeve 80 to the sheave 84 by first and second guides 94 and 96, such as pulleys. The second guide 96 is connected to the housing 56 of the tensioning device 50. The guides 94 and 96 help to position the flexible elongated member 54 such that the member 54 extends through the sleeve 80 in a direction generally parallel to the bottom edge 82 of the inflatable curtain 14 when the curtain 14 is in the inflated condition.

It will be recognized by those skilled in the art that the guides 94 and 96 could be omitted without negatively affecting the operation of the tensioning device 50. For example, the tensioning device 50 could be positioned such that the flexible elongated member 54 extends from the sleeve 80 directly to the sheave 84, and around the sheave 84 to the location 86.

Referring now to FIGS. 3 and 4, the tensioning device 50 includes a cylinder 100 and a piston 102. The piston 102 is movable within the cylinder 100 from a first, unactuated position (FIGS. 1 and 3) to a second, actuated position (FIGS. 2 and 4). In the unactuated condition of FIG. 3, the piston 102 is located at an end portion 110 of the cylinder 100. A piston rod 112 (FIGS. 3 and 4) connects the piston 102 to the tensioning member 52. Thus, the tensioning member 52 is movable with the piston 102 from an unactuated position (FIGS. 1 and 3) to an actuated position (FIGS. 2 and 4).

The housing 56 (FIGS. 3 and 4) includes a passage 120 having a first end 122, which is in fluid communication with the first end 110 of the cylinder 100. The passage 120 has a second end 124, which is in fluid communication with the fill tube 22. The fill tube 22 is connected to the housing 56 by known means such as a fitting 126.

The piston 102 has a generally U-shaped cross-section that forms a cylindrical volume in which a gas-generating material 130 (FIG. 3) is stored. The material 130 is ignitable to generate inflation fluid. The tensioning device 50 includes an initiator 140 which is actuatable to ignite the material 130. Thus, the inflator 24 comprises a part of the tensioning device 50.

The vehicle 12 includes a sensor device 132 (shown schematically in FIGS. 1 and 2) for sensing a side impact to the vehicle 12 and/or a rollover of the vehicle 12. The sensor device 132 actuates the inflator 24 in response to the sensing of a side impact or a vehicle rollover. In the event of a rollover of the vehicle or a side impact to the vehicle 12 of a magnitude greater than a predetermined threshold value, the sensor device 130 provides an electrical signal over lead wires 134 to the initiator 140. The electrical signal causes the initiator 140 to actuate the inflator 24 by igniting the gas-generating material 130 in a known manner. The ignited material 130 generates inflation fluid (not shown) which is discharged under pressure through the passage 120 into the fill tube 22. The fill tube 22 directs the fluid into the main chamber 34 of the inflatable curtain 14.

The inflatable curtain 14 (FIG. 2) inflates under the pressure of the inflation fluid from the inflator 24. The housing 26 opens and the inflatable curtain 14 inflates away from the roof 28 in a downward direction as viewed in the drawings and in a downward direction with respect to the direction of forward travel of the vehicle 12. The curtain 14, when inflated, extends along the side structure 16 of the vehicle 12 and is positioned between the side structure 16 of the vehicle 12 and any occupant of the vehicle 12.

When the inflator 24 is actuated, the inflation fluid inflates the inflatable curtain 14 while simultaneously actuating the tensioning device 50. The pressurized inflation fluid causes the piston 102 and the tensioning member 52 to move a given distance from the unactuated condition (FIGS. 1 and 3) to the actuated condition (FIGS. 2 and 4). As the curtain 14 inflates along the side structure 16 of the vehicle 12, the tensioning member 52 pulls upon and applies a tension to the flexible elongated member 54.

As a feature of the present invention, the tensioning device 50 retracts a length of the flexible elongated member 54 which is equal to at least approximately twice the given distance that the tensioning member 52 moves between the unactuated condition and the actuated condition. This is because the sheave 84 effectively doubles the length of the flexible elongated member 54 taken up by the tensioning device 50. The flexible elongated member 54 wraps around the sheave 84 and forms first and second portions 150 and 152 of the flexible elongated member 54 which extend from the sheave 84 and are generally parallel to each other. The first and second portions 150 and 152 are each approximately equal in length to the given distance that the tensioning member 52 moves.

It will be recognized by those skilled in the art that the length of the flexible elongated member 54 that is retracted by the tensioning member 52 can be increased by increasing the number of sheaves 84 that are fixed to the tensioning member 52. Also, the given distance that the tensioning member 52 moves to retract a given length of the flexible elongated member 54 can be decreased by increasing the number of sheaves 84 that are fixed to the tensioning member 52. For example, two sheaves 84 may be fixed to the tensioning member 52. In this instance, the tensioning member 52 would retract a length of the flexible elongated member 54 equal to approximately four times the given distance that the tensioning member 52 moves between the unactuated and actuated condition.

In the inflated condition, the tensioned flexible elongated member 54 resists movement of the inflatable curtain 14 away from the side structure 16 of the vehicle 12. Thus, the flexible elongated member 54 helps maintain the position of the inflated curtain 14 between any occupant of the vehicle 12 and the side structure 16 of the vehicle 12.

As the inflated curtain 14 deflates, the position of the curtain 14 is maintained by the tensioning device 50. When the curtain 14 is fully deflated, the flexible elongated member 54 still extends through the sleeve 80 and acts to hold the curtain 14 in position. Thus, the tensioning device 50 helps maintain the position of the curtain 14 between any occupant of the vehicle 12 and the side structure 16 of the vehicle 12 throughout the duration of the vehicle collision and/or rollover.

Those skilled in the art will recognize that it may be desirable to apply a tension to the inflatable curtain 14 in the downward direction in which the curtain 14 is inflated. In this instance, the first location 74 and the guide 94 may be positioned below the bottom edge 82 of the inflated inflatable curtain 14. As a result, when the inflatable curtain 14 is inflated, the flexible elongated member 54 would tension the curtain 14 in a downward direction as viewed in the drawings and in a downward direction with respect to the direction of forward travel of the vehicle 12.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for helping to protect an occupant of a vehicle which has a side structure and a roof, said apparatus comprising:

a vehicle occupant protection device which is inflatable away from the vehicle roof into a position between the side structure of the vehicle and a vehicle occupant, said vehicle occupant protection device when inflated extending along the side structure of the vehicle;

an inflator for providing inflation fluid for inflating said vehicle occupant protection device;

a flexible elongated member for resisting movement of said vehicle occupant protection device away from the side structure of the vehicle when said vehicle occupant protection device is inflated; and a tensioning member which is movable by said inflation fluid a given distance upon inflation of said vehicle occupant protection device to retract a length of said flexible elongated member equal to at least approximately twice said given distance when said tensioning member moves said given distance.

2. Apparatus as defined in claim 1, wherein said tensioning member comprises a part of a tensioning device which includes a cylinder and a piston, said piston being movable said given distance within said cylinder, said tensioning member being connected to said piston and movable with said piston.

3. Apparatus as defined in claim 2, wherein said inflator is in fluid communication with said cylinder, said inflator providing inflation fluid for actuating said tensioning device to move said piston and said tensioning member said given distance.

4. Apparatus as defined in claim 2, wherein said tensioning member includes a sheave which is movable with said tensioning member, said flexible elongated member having first and second opposite ends, said first end being connected to the vehicle side structure at a first location, said second end being connected to said tensioning device, said flexible elongated member extending around said sheave.

5. Apparatus as defined in claim 2, wherein said inflator comprises a part of said tensioning device, said inflator including a generant for generating said inflation fluid, said generant being disposed in an end portion of said cylinder, said tensioning device including a passage in fluid communication with said end portion of said cylinder for communicating said inflation fluid to said vehicle occupant protection device.

6. Apparatus as defined in claim 2, wherein said vehicle occupant protection device is an inflatable curtain having a stored position extending along the side structure adjacent the vehicle roof, said inflatable curtain having a top edge positioned adjacent to the vehicle roof and an opposite bottom edge, said flexible elongated member extending through a sleeve located along said bottom edge of said inflatable curtain.

7. Apparatus as defined in claim 6, further including a fill tube having a portion located in said inflatable curtain, said inflator being in fluid communication with said fill tube, said inflator, when actuated, providing inflation fluid to said fill tube, said fill tube directing said inflation fluid into said inflatable curtain to inflate said inflatable curtain.

8. Apparatus as defined in claim 6, further including a sensor for sensing a vehicle condition for which inflation of said side curtain is desired, said sensor actuating said inflator to provide inflation fluid to said fill tube and said tensioning device.

* * * * *